UNITED STATES PATENT OFFICE.

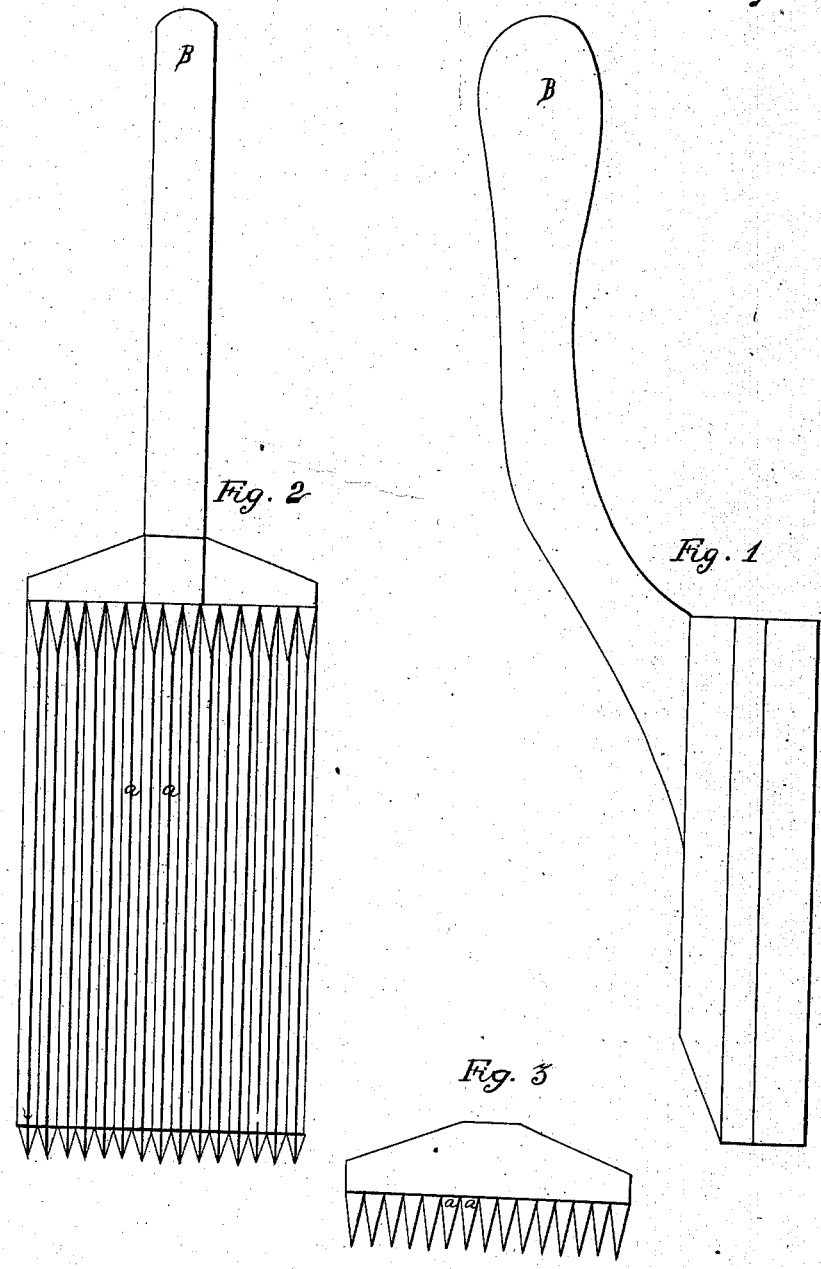

J. P. DORMAN, OF GALESBURG, ILLINOIS.

STEAK-MANGLER.

Specification forming part of Letters Patent No. 49,245, dated August 8, 1865.

*To all whom it may concern:*

Be it known that I, J. P. DORMAN, of Galesburg, county of Knox, and State of Illinois, have invented a new and useful Machine or Instrument for Mangling or Crushing Meat, called a "Steak-Mangler;" and I do declare that the following is a clear and full description of the construction and operation of the same, reference being had to the annexed drawings, making a part of this specification, in which—

Figure 1 is a side or lateral view, and Fig. 2 is the under-side view, thereby showing the shape and size of the knives; and Fig. 3 is an end view, thereby showing the depth of the knives, and *a a* in Figs. 2 and 3 showing both the full size and shape of the knives when used.

This is a hand instrument, and is so simple that any one can use it. It may be made of steel, cast-steel, iron, or other hard substance.

I take a piece of meat or steak and lay it on a block or board, then take hold of the handle B, and with an up-and-down motion of the arm striking the meat as it comes down, the meat very soon becomes mangled and is fit for the griddle.

I claim—

The construction of a cast-iron longitudinal triangular-shaped tooth-plate, and the application of it, substantially in the manner and for the purpose herein set forth.

J. P. DORMAN.

Witnesses:
J. R. GORDON,
T. M. BUNDY.